United States Patent [19]
Harvey

[11] Patent Number: 6,060,141
[45] Date of Patent: May 9, 2000

[54] SYSTEM AND METHOD FOR FRAMING

[75] Inventor: Scott Robert Harvey, Carrollton, Tex.

[73] Assignee: Military Model Distributors, Inc., Carrollton, Tex.

[21] Appl. No.: 08/873,313

[22] Filed: Jun. 11, 1997

[51] Int. Cl.[7] ........................................................ B64C 1/14
[52] U.S. Cl. ..................... 428/40.1; 118/504; 118/505; 135/87; 244/190; 428/41.6; 428/42.1; 428/134; 428/137; 428/203; 428/204
[58] Field of Search ................... 428/40.1, 41.6, 428/42.1, 134, 137, 203, 204; 118/504, 505; 135/87; 244/190

[56] References Cited

U.S. PATENT DOCUMENTS

| | | | |
|---|---|---|---|
| 4,312,688 | 1/1982 | Brodis | 428/41.6 |
| 4,389,030 | 6/1983 | San Miguel | 244/129.3 |
| 4,921,740 | 5/1990 | Falconer | 428/41.6 |

*Primary Examiner*—Nasser Ahmad
*Attorney, Agent, or Firm*—Carr & Storm, L.L.P.; Jack D. Stone, Jr.

[57] ABSTRACT

A system for framing a canopy has a carrier sheet and a coating of adhesive deposited onto the carrier sheet. A transparent film is cast over the coating of adhesive, and the film defines a plurality of slits configured for forming frames or masks which conform to the shape of the canopy. Alternatively, in a method for framing a canopy having interior and exterior sides, a first coat of paint having a first color is applied onto a first side of a transparent film, and a second coat of paint having a second color is applied onto the first coat of paint. A second side of the film is then adhered to the exterior side of the canopy so that the first coat of paint is visible on the interior side of the canopy, and the second coat of paint is visible on the exterior side of the canopy.

52 Claims, 5 Drawing Sheets

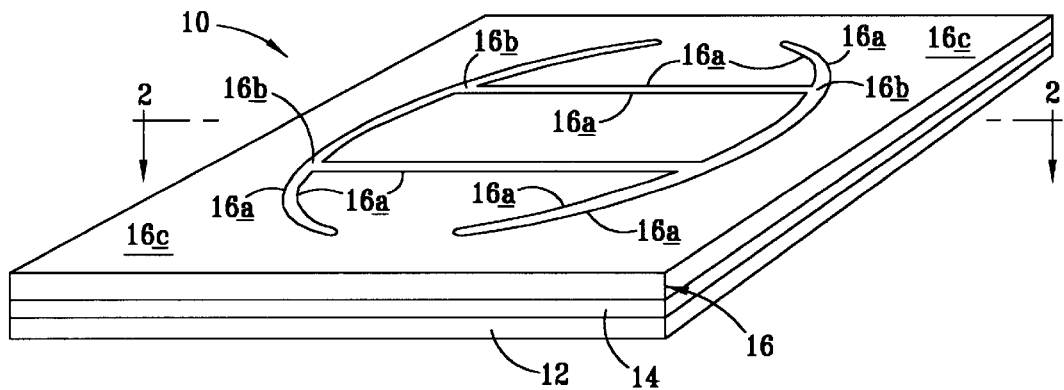
FIG. 1
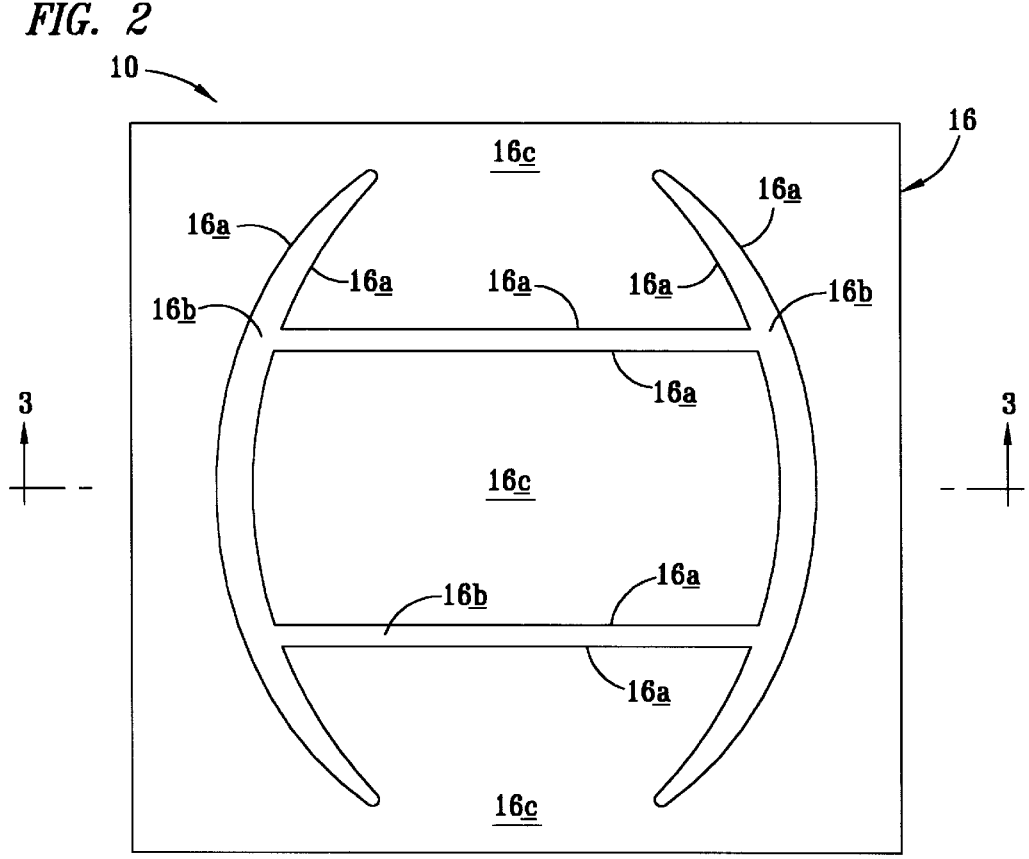
FIG. 2
FIG. 3
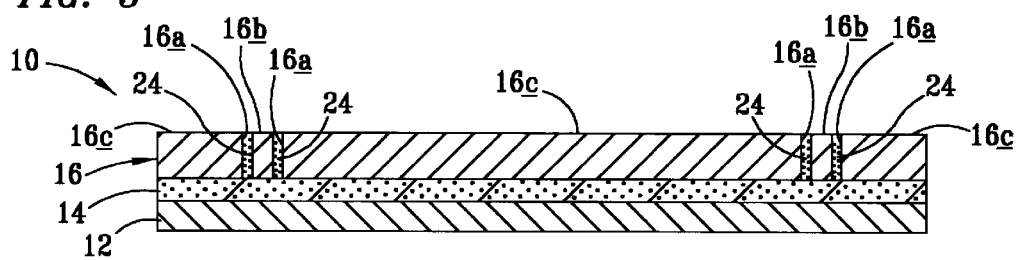

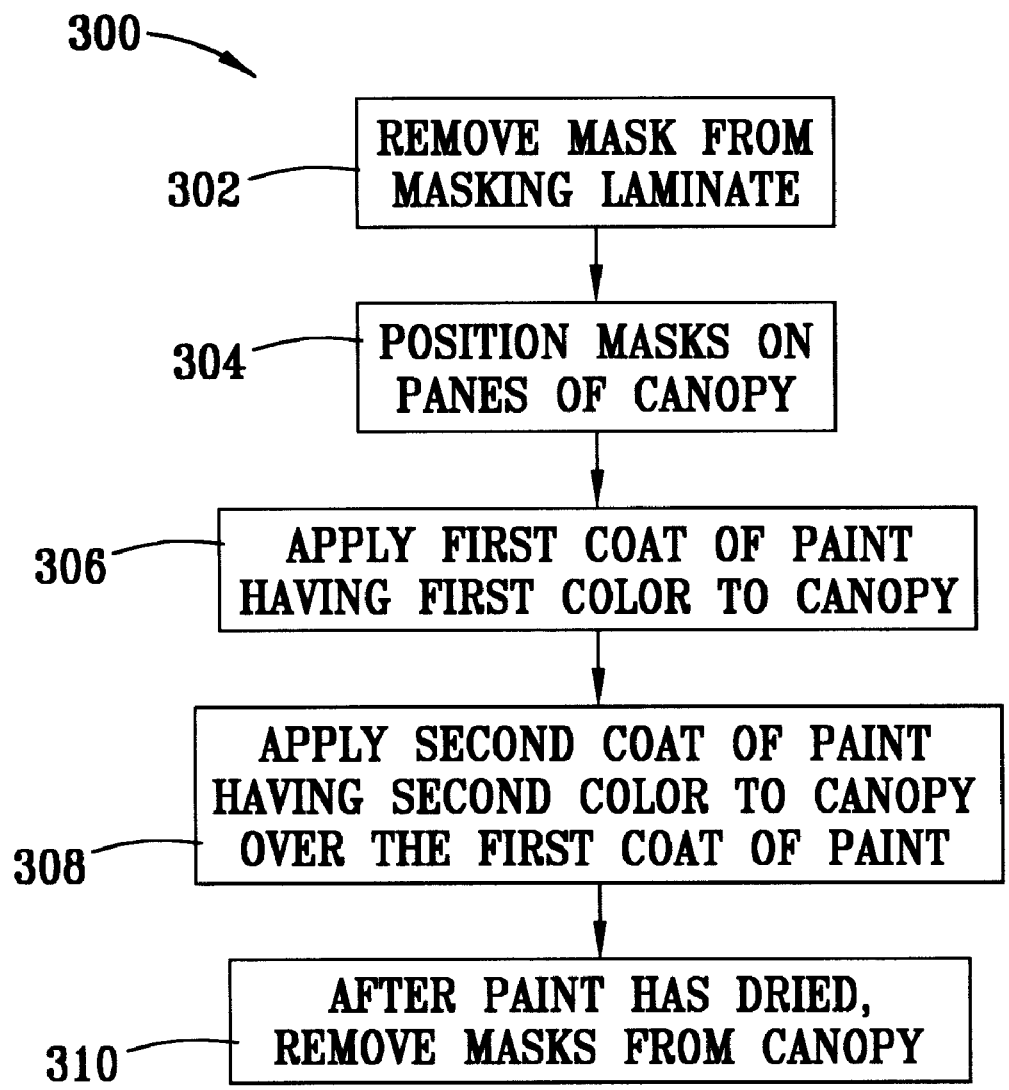

SYSTEM AND METHOD FOR FRAMING

FIELD OF THE INVENTION

The invention relates generally to a system and method for framing and, more particularly, to such a system and method for framing model aircraft canopies.

BACKGROUND OF THE INVENTION

Model aircraft typically have canopies which constitute a relatively detailed component of the aircraft. The canopies are generally supplied to an end user, such as a modeler, as a single piece of transparent shaped plastic which is attached to the aircraft. To make the canopies appear to be realistic, the modeler must paint the frame of the canopy, i.e., that portion of the canopy structurally supporting transparent plastic portions which simulate glass panes in the canopy. It can be appreciated, when the frame is painted, that the transparent plastic portions simulating glass panes in the canopy should remain transparent and not be painted. For this reason and the additional reason that canopies are commonly very detailed, it can be further appreciated that it is very time consuming and tedious to paint canopies. Furthermore, even with much time and effort applied toward the painting of the frame of a canopy, it very unlikely that the paint will be precisely applied and that the simulated glass panes will remain untouched by the paint.

Another problem associated with canopy frames is that the interior of the frames must also be painted. This is because the canopy, or a portion thereof, is often attached to the body of the aircraft so that the interior side of the canopy frame is often visible. Furthermore, the interior side of the canopy frame is generally a different color from the exterior side thereof. The interior of the canopy frame must therefore be painted separately from the exterior side of the canopy frame. Because access to the interior side is more limited than access to the exterior side, the interior side is even more difficult to paint than the exterior side. Additionally, any paint inadvertently applied to the exterior or interior side of the glass panes between the frames shows through to the other side.

One solution to the foregoing problems is to apply decals to the canopy frame. However, it is extremely difficult, when painting the body of an aircraft, to match the color used on the aircraft to the printed color of a decal. Furthermore, a decal on the exterior side of a canopy does not provide any color to the interior side of the canopy frame, thereby requiring a second decal for the interior side. If a second decal is used, it must be precisely aligned with the first decal to avoid a decal shadowing effect which would show through from each side to the other side of the simulated glass panes of the canopy.

A further drawback with decals is that they typically have a thickness of approximately 0.5 mils (0.0005 inches), which is not sufficiently thick to accurately represent the scaled thickness of a frame on a canopy.

Therefore, what is needed is a system and method for easily and precisely applying color to the interior as well as to the exterior sides of a canopy frame, and for accurately representing the scaled thickness of the frame.

SUMMARY OF THE INVENTION

The present invention provides a system and a method for easily and precisely applying color to the interior as well as to the exterior sides of a canopy frame, and for accurately representing the scaled thickness of the frame. Accordingly, a system for framing a canopy has a carrier sheet and a coating of adhesive deposited onto the carrier sheet. A transparent film is cast over the coating of adhesive, and a plurality of slits in the film define frames or masks which conform to the shape of the canopy.

In further accordance with the present invention, a method is provided for framing a canopy having interior and exterior sides, whereby a first coat of paint defining the interior color of the canopy is applied onto a first side of a transparent film, and a second coat of paint defining the exterior color of the canopy is applied onto the first coat of paint. A second side of the film is then adhered to the exterior side of the canopy so that the first coat of paint is visible on the interior side of the canopy, and the second coat of paint is visible on the exterior side of the canopy.

An advantage achieved with the present invention is that the same paint that is used to paint the body of an aircraft is also used to paint the frames of the canopy, so that colors between the frames and the body of the aircraft are matched much better than is possible with decals.

Another advantage achieved with the present invention is that the frames of the canopy are much more easily, quickly, and precisely made and applied than is possible using conventional techniques.

Another advantage achieved with the present invention is that color visible on the interior of a canopy may be applied simultaneously with color visible on the interior of the canopy, thereby obviating the need for using separate frames or decals for the exterior and the interior of the canopy.

Another advantage achieved with the present invention is that no alignment is required between frames to avoid shadowing and, furthermore, shadowing cannot occur, as with decals.

Another advantage achieved with the present invention is that the frames of the present invention are thicker than decals, and more accurately represent the scaled thickness of an aircraft canopy frame than is possible with decals.

BRIEF DESCRIPTION OF THE DRAWINGS

FIG. 1 is a perspective view of a framing laminate embodying features of the present invention.

FIG. 2 is a top view of the framing laminate of FIG. 1 taken along the line 2—2 of FIG. 1.

FIG. 3 is an elevational view of the framing laminate of FIG. 1 taken along the line 3—3 of FIG. 2.

FIG. 10 is a flow chart depicting steps for employing the masking laminate of FIGS. 8–9 by the end user.

DETAILED DESCRIPTION

Figure 4:
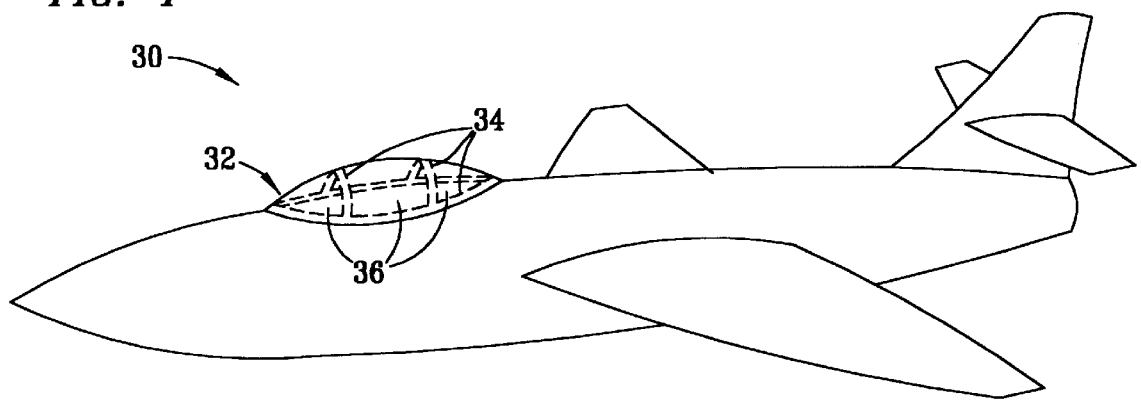
FIG. 4 is a perspective view of a model aircraft having a canopy in which the framing laminate of the present invention may be implemented.

Referring to FIG. 1 of the drawings, the reference numeral 10 generally designates a framing laminate embodying features of the present invention. The framing laminate 10 includes a carrier sheet 12 fabricated from a suitable backing material such as 98 pound stay-flat siliconized liner. A coating of a suitable adhesive 14, such as a progressive-cure, polymer, acrylic adhesive, having a relatively low cross-link density, compatible plasticizers, and a suitable thickness, such as 0.5 mil (0.0005 inches), is deposited on the carrier sheet 12. A transparent polyvinyl chloride (PVC) film 16, having a suitable thickness, preferably between 1 and 3 mils, such as 2 mil (0.002 inches), is cast over the adhesive coating 14. As shown in FIG. 1, as well as in FIG. 3, described below, the thicknesses of the carrier sheet 12, adhesive 14, and PVC film 16 are not shown to scale, but are exaggerated for the sake of clarity of description. The foregoing combination of carrier sheet 12, adhesive coating 14, and PVC film 16 is available in 24 inch×50 yard rolls as Part Number 7234 from Ritrama Duramark, located in Cleveland, Ohio, and therefore will not be described in further detail herein.

Referring to FIGS. 1–3, the PVC film 16 defines a plurality of slits 16a which partition the film between a framing pattern 16b configured for placement as a frame on a canopy, as described below, and excess film 16c which is not used on the canopy. The slits 16a extend through the film 16 to the adhesive 14 (no material is removed from the film 16 to form the slits 16a). The slits 16a may be formed in the film 16 using a suitable plotter such as a Summagraphics Pro T610 available from Houston Instruments in Houston, Tex. Powder 24, such as carbon powder, charcoal powder, or graphite, is deposited in the slits 16a for demarcating the slits, thereby rendering the slits clearly visible to the end user. It is understood that, while only one framing pattern 16b is depicted in FIGS. 1–3, any number of framing patterns could be formed in the framing laminate 10 as space permits and, furthermore, that the frames may take any shape desired to conform with a particular canopy or a portion of a canopy thereof.

FIG. 4 illustrates a perspective view of a model aircraft 30 having a transparent plastic canopy 32. The canopy 32 typically includes framing lines 34 formed therein which outline the frame of the canopy and hence identify where the framing pattern 16b is to be positioned. The canopy 32 also includes simulated panes of glass 36 contained within the frame outlined by the framing lines 34. It can be appreciated that, while the framing pattern 16b defined in the film 16 is two-dimensional, i.e., planar, it is configured in a manner described below with reference to FIG. 5 for conforming to the shape of the three-dimensional canopy 32 and the framing lines 34.

Figure 5:
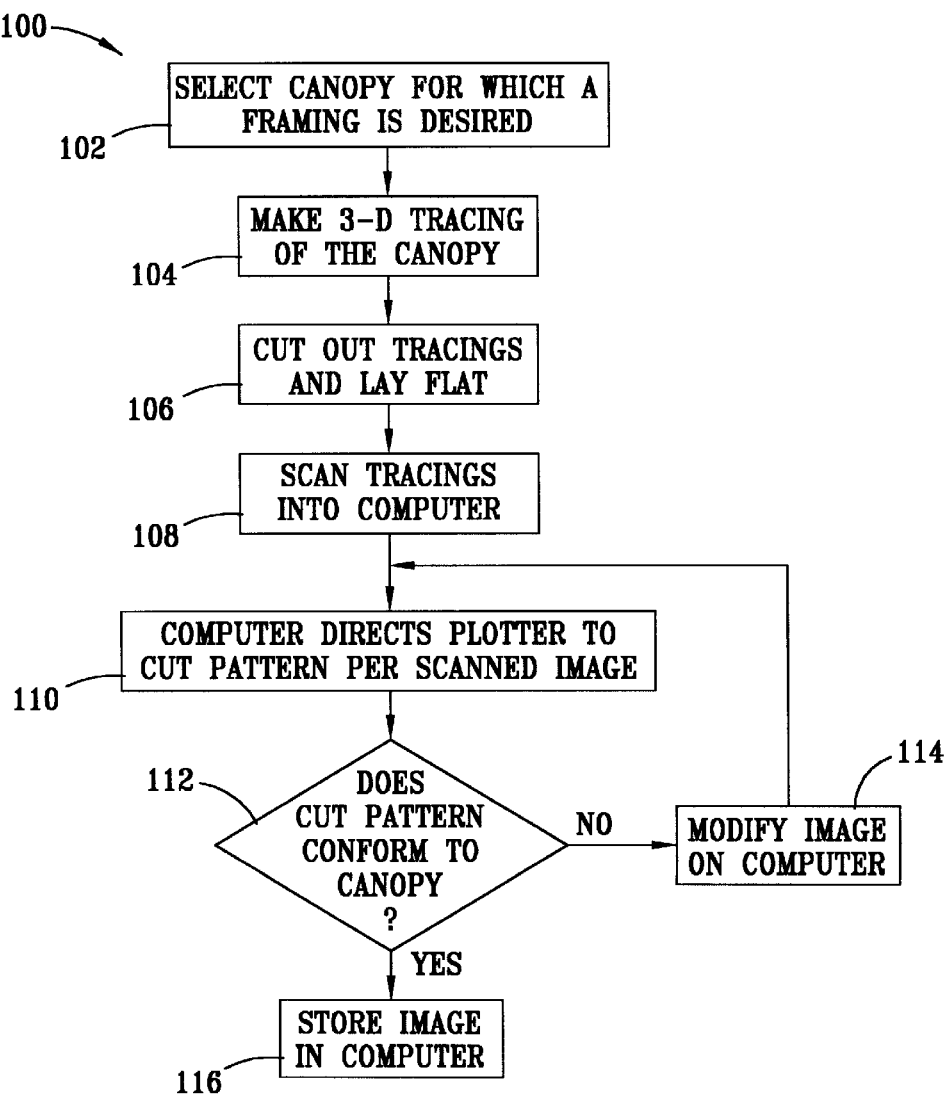
FIG. 5 is a flow chart depicting steps for designing the framing pattern of FIGS. 1–3.

FIG. 5 shows a flow chart depicting the steps of a method 100 that may be performed by a manufacturer of the framing laminate 10 in accordance with the present invention for designing the shapes of the framing patterns 16b. Accordingly, in step 102 of the method 100, a specific model aircraft canopy 32 is selected for which the framing pattern 16b is to conform. In step 104, a three-dimensional tracing is made of the selected canopy 32 by positioning a flexible tracing medium (not shown), such as a paint mask having a suitable thickness, preferably between 1 and 3 mils, such as 2 mil (0.002 inches) over the canopy, and tracing an outline of the canopy onto the medium with a fine point marker. The foregoing tracing medium is available as Part Number 8668 from Ritrama Duramark, located in Cleveland, Ohio, and therefore will not be described in further detail herein. In step 106, the traced outline is cut out and laid flat and, in step 108, the flat outline is scanned into a computer (not shown) in a conventional manner. In step 110, the computer directs a plotter configured for cutting patterns to cut a framing pattern in accordance with the image scanned and stored in the computer. In step 112, the cut framing pattern is tested by being fitted onto the canopy selected in step 102, and a determination is made whether the cut framing pattern conforms to the canopy. If in step 112, a determination is made that the framing pattern does not conform to the canopy, then execution proceeds to step 114, in which the pattern is modified on the computer and execution returns to step 110. If in step 112, a determination is made that the framing pattern conforms to the canopy, then execution proceeds to step 116 in which the framing pattern is saved in the computer and permanently stored onto a back-up disc, and additional framing patterns are cut as desired.

Figure 6:
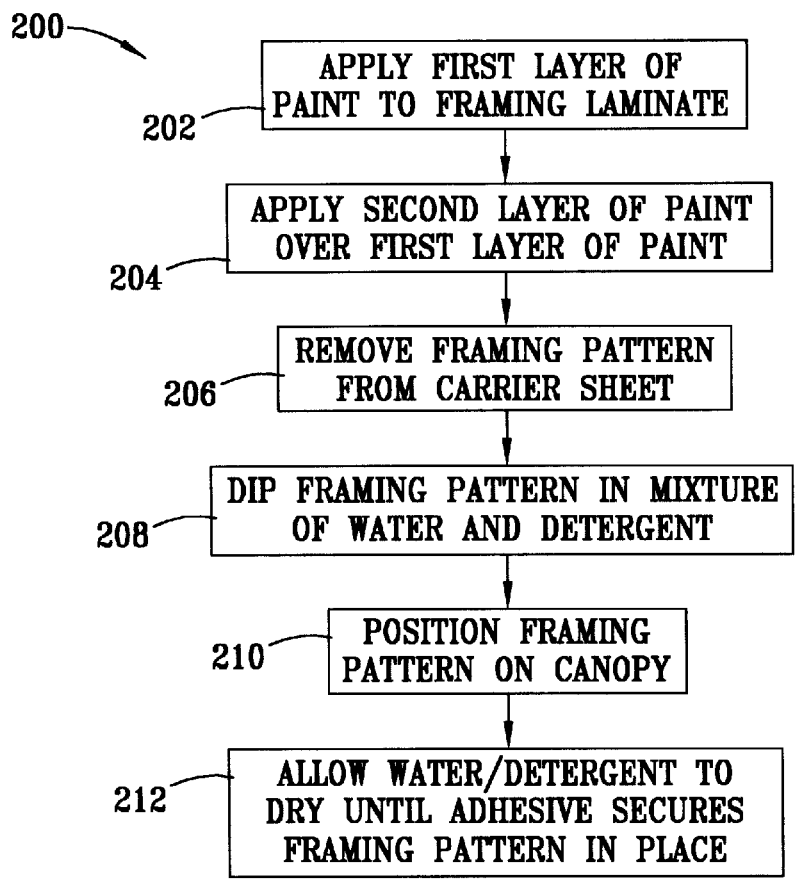
FIG. 6 is a flow chart depicting steps for employing the framing laminate of FIGS. 1–3 by the end user.
Figure 7:
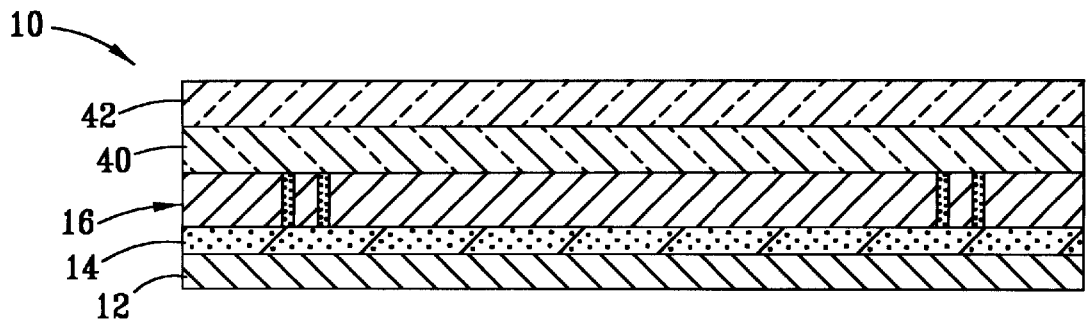
FIG. 7 is an elevational view similar to that of FIG. 3 taken after the execution of certain steps prescribed in the flow chart of FIG. 6.

FIG. 6 shows a flow chart depicting the steps of a method 200 that may be performed by an end user in accordance with the present invention for placing the framing pattern 16b onto the canopy 32. Accordingly, in step 202 of the method 200, a first layer, or coat, 40 of paint, such as an acrylic, enamel, metalizer, or the like, is applied, preferably with an airbrush, to the film 16 of the framing laminate 10, as shown in FIG. 7. The color of the first coat 40 of paint is selected as the color of the framing pattern 16b which should be visible on the interior side of the canopy 32. In step 204, a second layer, or coat, 42 of paint, such as an acrylic, enamel, metalizer, or the like, is applied, preferably with an airbrush, to the first coat 40 of paint, as depicted in FIG. 7. The color of the second coat 42 of paint is selected to match the color of the framing pattern 16b which should desirably be visible on the exterior side of the canopy 32, which color is generally the exterior color of the body of the aircraft 30.

In step 206, while the framing laminate 10 is preferably held under strong lighting, the excess film 16c is carefully removed using a suitable instrument, such as tweezers or a No. 11 Exacto ™ knife, from the carrier sheet 12 so that only the framing pattern 16b remains on the carrier sheet, and then the framing pattern 16b is carefully removed from the carrier sheet. In step 208 the removed framing pattern 16b is dipped in a suitable water/detergent solution, such as approximately 8 ounces of water having between 2 and 3 drops of liquid detergent mixed therein, for preventing the framing pattern 16b from adhering to the canopy 32 until the frame is in its proper position on the canopy, as described in step 210 described next. In step 210, the framing pattern 16b is removed from the water/detergent solution and positioned on the canopy 32 so that the framing pattern 16b is aligned with the lines 34 and conforms with the shape of the canopy. In step 212, the water/detergent solution is allowed to dry, until the adhesive 14 secures the framing pattern 16b in place on the canopy 32.

The present invention has several advantages. For example, the same paint that is used to paint the body of a model aircraft may also be used to paint the frames of the canopy, so that colors between the frames and the body of the aircraft may be perfectly matched. Another advantage is that the frames of the canopy are much more easily, quickly, and precisely made and applied than is possible using conventional techniques. Still another advantage is that color visible on the interior of a canopy may be applied simultaneously with color visible on the interior of the canopy, thereby obviating the need for using separate frames or decals for the exterior and the interior of the canopy. Still another advantage is that no alignment is required between frames, as with decals, to avoid shadowing and, furthermore, shadowing cannot occur. Still another advantage is that the frames of the present invention are thicker than decals, thereby rendering the frames more realistic than is possible with decals.

It is understood that the present invention can take many forms and embodiments. The embodiments described herein are intended to illustrate rather than to limit the invention. Accordingly, several variations may be made in the foregoing without departing from the spirit or the scope of the invention. For example, the framing patterns 16b in the framing laminate 10 may be die cut rather than cut using a plotter. The carrier sheet 12 may be fabricated from materials other than a 98 pound stay-flat siliconized liner, such as paper or siliconized paper of any suitable weight. The film may be fabricated from materials other than PVC, such as acetate, urethane, or other types of vinyl. Adhesives other than progressive-cure, polymer, acrylic adhesive which would be suitable for the film material may also be used.

Figure 8:
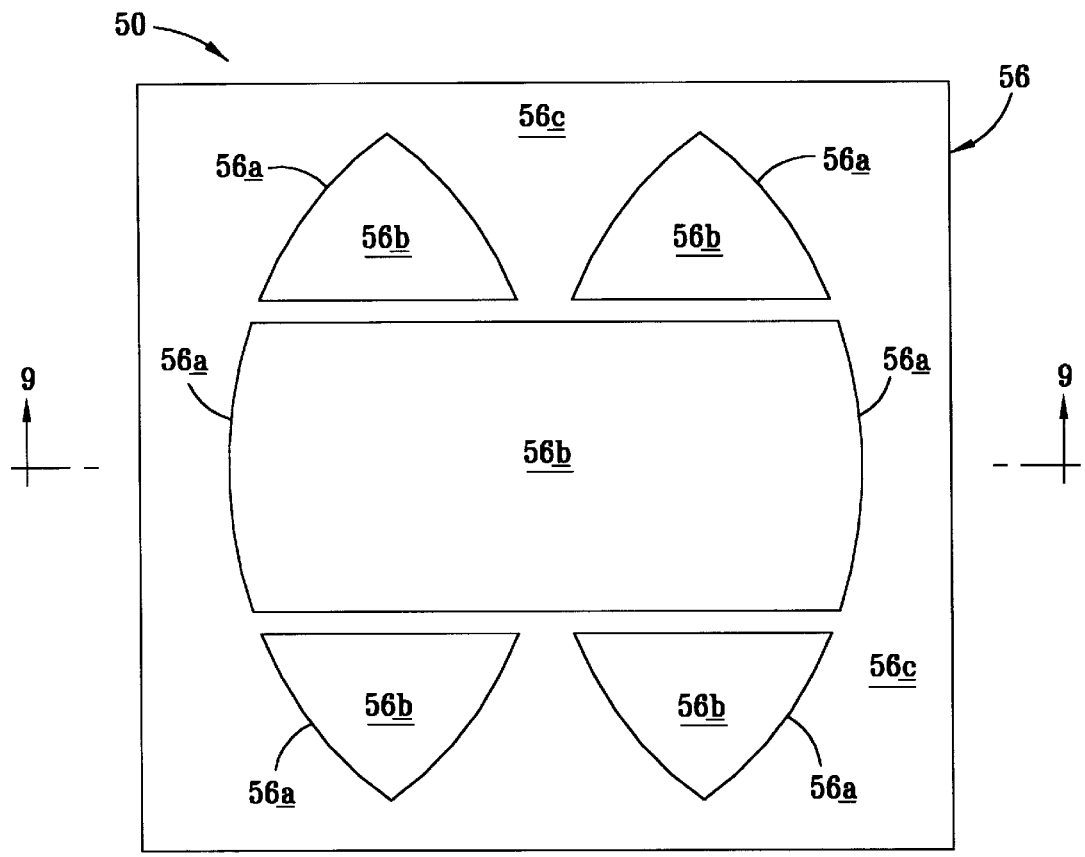
FIG. 8 is a top view of a masking laminate according to an alternate embodiment of the present invention.

In still another variation of the present invention, a laminate similar to the framing laminate 10 may be utilized for masking the panes 36 interposed between the frames 34, rather than for simulating the frames themselves. accordingly, in FIG. 8, the reference numeral 50 refers in general to a masking laminate, similar to the framing laminate 10 depicted in FIG. 2, but in which a method different from that depicted in FIG. 6 is employed for applying masks.

Figure 9:
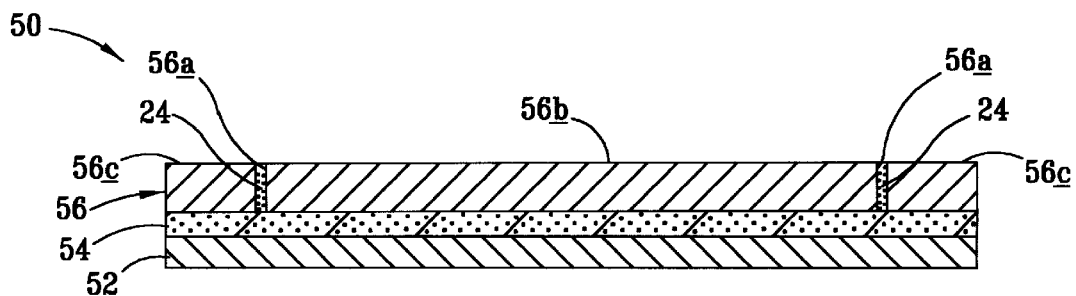
FIG. 9 is an elevational view of the masking laminate of FIG. 8 taken along the line 9—9 of FIG. 8.

According to the embodiment of FIGS. 8 and 9, the masking laminate 50 includes a carrier sheet 52 fabricated from a suitable backing material such as 98 pound stay-flat siliconized liner. A coating of a suitable adhesive 54, such as a non-permanent, non-progressive-cure, polymer, acrylic adhesive, having a relatively high cross-link density, compatible plasticizers, and a suitable thickness, such as 0.5 mil (0.0005 inches), is deposited on the carrier sheet 52. A transparent polyvinyl chloride (PVC) film 56, having a suitable thickness, preferably between 1 and 3 mils, such as 2 mil (0.002 inches), is cast over the adhesive coating 54. As shown in FIG. 9, the thicknesses of the carrier sheet 52, adhesive 54, and PVC film 56 are not shown to scale, but are exaggerated for the sake of clarity of description. The foregoing combination of carrier sheet 52, adhesive coating 54, and PVC film 56 is available in 24 inch×50 yard rolls as Part Number 8668 from Ritrama Duramark, located in Cleveland, Ohio, and therefore will not be described in further detail herein.

A plurality of slits 56a partition masks 56b from excess film 56c, which masks are configured for placement on the panes 36 of the canopy 32 shown in FIG. 4. The slits 56a extend through the film 56 to the coating of adhesive 54 and may be formed in the film using a suitable plotter as described in the previous embodiment. The powder 24 is deposited in the slits 56a for demarcating the slits, thereby rendering the slits clearly visible to the end user. It is understood that, while five masks 56b are depicted in FIG. 8, any number of masks may be formed in the masking laminate 50 as space permits and, furthermore, the masks may take any shape desired to conform with the panes of a particular canopy.

The steps of a method that may be performed by a manufacturer of the asking laminate 50 for designing the shapes of the masks 56b are virtually identical to those depicted in the method 100 shown in FIG. 5, except that the steps are applied with reference to the masking laminate 50 instead of the framing laminate 10. Because the steps are otherwise identical to those of the method 100, they will not be described in any further detail herein.

FIG. 10 shows a flow chart depicting the steps of a method 300 that may be performed by an end user in accordance with the present invention for placing the masks 56b onto the canopy 32. Accordingly, in step 302 of the method 300, the mask 56b is carefully removed from the masking laminate 50, and, in step 304, the mask 56b is carefully positioned on the panes 36 of the canopy 32 so that, on the canopy, only the frame defined within the lines 34 is visible.

In step 306, a first coat 60 of paint, such as an acrylic, enamel, metalizer, or the like, is applied in a conventional manner to the canopy 32. The color of the first coat 60 of paint is selected as the color which should be visible on the interior side of the canopy 32. In step 308, a second coat 62 of paint, such as an acrylic, enamel, metalizer, or the like, is applied in a conventional manner over the first coat 60 of paint, preferably when the surrounding portions of the aircraft 30 are painted so that the color of the exterior side of the canopy 32 will match that of the aircraft. Once the coats 60 and 62 of paint have dried, in step 310, the masks 56b are removed, leaving the panes 36 of the canopy 32 transparent, and the colors of the first and second coats 60 and 62, respectively, visible on the interior and exterior sides, respectively, of the canopy 32.

In addition to the advantages of the previous embodiment, the alternate embodiment of the present invention has still further advantages. For example, when the frame of the canopy 32 includes fine detail such as rivets, the coats 60 and 62 of paint permit greater visibility of such details than is possible using the framing patterns 16b.

Although illustrative embodiments of the invention have been shown and described, a wide range of modification, change, and substitution is contemplated in the foregoing disclosure and in some instances, some features of the present invention may be employed without a corresponding use of the other features. Accordingly, it is appropriate that the appended claims be construed broadly and in a manner consistent with the scope of the invention.

What is claimed is:

1. A system for framing a canopy, comprising:
   a carrier sheet;
   a coating of non-permanent adhesive deposited onto the carrier sheet; and
   a transparent film cast over the coating of adhesive, wherein the film defines a plurality of slits configured for forming patterns which conform to the shape of the shape of canopy.

2. The system of claim 1 wherein the patterns are framing patterns.

3. The system of claim 1 wherein the patterns are masks.

4. The system of claim 1 further comprising powder deposited in the slits for demarcating the patterns formed therein.

5. The system of claim 4 wherein the powder is selected from the group consisting of carbon powder, charcoal powder, and graphite.

6. The system of claim 1 wherein the carrier sheet comprises a siliconized liner.

7. The system of claim 1 wherein the film comprises a material selected from the group consisting of acetate, urethane, vinyl, and polyvinyl chloride.

8. The system of claim 1 wherein the adhesive is a progressive cure polymer acrylic adhesive.

9. The system of claim 1 wherein the film has thickness of between 1 and 3 mils.

10. The system of claim 1 further comprising:
    a first coat of paint having a first color applied onto a first side of the transparent film; and
    a second coat of paint having a second color applied onto the first coat of paint.

11. The system of claim 1 wherein the film is adhered to the panes of an exterior side of a canopy.

12. The system of claim 1 wherein the film is adhered to the panes of an exterior side of a canopy, and wherein the system further comprises a first coat of paint having a first color applied to that portion of the exterior side of the canopy where the film is not applied.

13. The system of claim 1 wherein the film is adhered to the panes of an exterior side of a canopy, and wherein the system further comprises a first coat of paint having a first color applied to that portion of the exterior side of the canopy where the film is not applied, and a second coat of paint having a second color applied over the first coat of paint.

14. A system for applying paint to at least one selected portion of a canopy, the at least one selected portion being demarcated by the frame of the canopy, comprising:
   a carrier sheet;
   a coating of non-permanent adhesive deposited onto the carrier sheet; and
   a transparent film cast over the coating of adhesive, wherein the film defines a plurality of slits configured for forming patterns which conform to the at least one selected portion of the canopy.

15. The system of claim 14 wherein the at least one selected part of the canopy includes the frame of the canopy.

16. The system of claim 14 wherein the at least one selected portion of the canopy includes the panes of the canopy.

17. The system of claim 14 further comprising powder deposited in the slits for demarcating the pattern.

18. The system of claim 14 further comprising:
   a first coat of paint having a first color applied onto a first side of the transparent film; and
   a second coat of paint having a second color applied onto the first coat of paint.

19. The system of claim 14 wherein the carrier sheet comprises a siliconized liner.

20. The system of claim 14 wherein the film comprises a material selected from the group consisting of acetate, urethane, vinyl, and polyvinyl chloride.

21. The system of claim 14 wherein the adhesive is a progressive cure polymer acrylic adhesive.

22. A system providing for paint to be applied to the frame of a canopy, comprising:
   a carrier sheet;
   a coating of non-permanent adhesive deposited onto the carrier sheet; and
   a transparent film cast over the coating of adhesive, wherein the film defines a plurality of slits configured for conforming to at least one selected portion of the canopy, the at least one selected portion of the canopy being demarcated by the frame of the canopy.

23. The system of claim 22 wherein the at least one selected portion includes the frame of the canopy.

24. The system of claim 22 wherein the at least one selected portion includes the panes of the canopy.

25. The system of claim 22 further comprising powder deposited in the slits for demarcating the selected portions of the canopy.

26. The system of claim 22 further comprising:
   a first coat of paint having a first color applied onto a first side of the transparent film; and
   a second coat of paint having a second color applied onto the first coat of paint.

27. The system of claim 22 wherein the carrier sheet comprises a siliconized liner.

28. The system of claim 22 wherein the film comprises a material selected from the group consisting of acetate, urethane, vinyl, and polyvinyl chloride.

29. A system for framing a canopy, comprising:
   a carrier sheet;
   a coating of non-permanent adhesive deposited onto the carrier sheet;
   a transparent film cast over the coating of adhesive, wherein the film defines a plurality of slits configured for forming patterns which conform to the shape of the canopy; and
   powder deposited in the slits for demarcating the patterns formed therein.

30. The system of claim 29 wherein the patterns are framing patterns.

31. The system of claim 29 wherein the patterns are masks.

32. The system of claim 29 wherein the powder is selected from the group consisting of carbon powder, charcoal powder, and graphite.

33. A system for framing a canopy, comprising:
   a carrier sheet;
   a coating of adhesive deposited onto the carrier sheet;
   a transparent film cast over the coating of adhesive, wherein the film defines a plurality of slits configured for forming patterns which conform to the shape of the canopy;
   a first coat of paint having a first color applied onto a first side of the transparent film; and
   a second coat of paint having a second color applied onto the first coat of paint.

34. A system for framing a canopy, comprising:
   a carrier sheet;
   a coating of adhesive deposited onto the carrier sheet;
   a transparent film cast over the coating of adhesive, wherein the film defines a plurality of slits configured for forming a pattern which, when adhered to the panes of an exterior side of the canopy, conforms to the panes of the exterior side of the canopy, so that a first coat of paint having a first color may be applied to that portion of the exterior side of the canopy where the film is not applied, and a second coat of paint having a second color may be applied over the first coat of paint.

35. A system for applying paint to at least one selected portion of a canopy, the at least one selected portion being demarcated by the frame of the canopy, comprising:
   a carrier sheet;
   a coating of non-permanent adhesive deposited onto the carrier sheet;
   a transparent film cast over the coating of adhesive, wherein the film defines a plurality of slits configured for forming patterns which conform to the at least one selected portion of the canopy; and
   powder deposited in the slits for demarcating the pattern.

36. A system for applying paint to at least one selected portion of a canopy, the at least one selected portion being demarcated by the frame of the canopy, comprising:
   a carrier sheet;
   a coating of adhesive deposited onto the carrier sheet; and
   a transparent film cast over the coating of adhesive, wherein the film defines a plurality of slits configured for forming patterns which conform to the at least one selected portion of the canopy;
   a first coat of paint having a first color applied onto a first side of the transparent film; and a second coat of paint having a second color applied onto the first coat of paint.

37. A system providing for paint to be applied to the frame of a canopy, comprising:
   a carrier sheet;
   a coating of adhesive deposited onto the carrier sheet;
   a transparent film cast over the coating of adhesive, wherein the film defines a plurality of slits configured for conforming to at least one selected portion of the canopy, the at least one selected portion of the canopy being demarcated by the frame of the canopy;
   a first coat of paint having a first color applied onto a first side of the transparent film; and
   a second coat of paint having a second color applied onto the first coat of paint.

38. A system providing for paint to be applied to the frame of a canopy, comprising:
   a carrier sheet comprising a siliconized liner;
   a coating of non-permanent adhesive deposited onto the carrier sheet; and
   a transparent film cast over the coating of adhesive, wherein the film defines a plurality of slits configured for conforming to at least one selected portion of the canopy, the at least one selected portion of the canopy being demarcated by the frame of the canopy.

39. A system for framing a canopy, comprising:
   a carrier sheet;
   a coating of non-permanent adhesive deposited onto the carrier sheet; and
   a film cast over the coating of adhesive, wherein the film defines a plurality of slits configured for forming patterns which conform to the shape of the canopy.

40. A system for framing a canopy, comprising:
   a carrier sheet;
   a coating of non-permanent adhesive deposited onto the carrier sheet;
   a film cast over the coating of adhesive, wherein the film defines a plurality of slits configured for forming patterns which conform to the shape of the canopy; and
   powder deposited in the slits for demarcating the patterns formed therein.

41. A system for applying paint to at least one selected portion of a canopy, the at least one selected portion being demarcated by the frame of the canopy, comprising:
   a carrier sheet;
   a coating of adhesive deposited onto the carrier sheet; and
   a film cast over the coating of adhesive, wherein the film defines a plurality of slits configured for forming patterns which conform to the at least one selected portion of the canopy.

42. A system for applying paint to at least one selected portion of a canopy, the at least one selected portion being demarcated by the frame of the canopy, comprising:
   a carrier sheet;
   a coating of adhesive deposited onto the carrier sheet;
   a film cast over the coating of adhesive, wherein the film defines a plurality of slits configured for forming patterns which conform to the at least one selected portion of the canopy; and
   powder deposited in the slits for demarcating the pattern.

43. A system for framing a canopy, comprising:
   a carrier sheet;
   a film defining a plurality of slits configured for forming patterns which conform to the shape of the canopy; and
   non-permanent adhesive securing the film to the carrier sheet.

44. A system for framing a canopy, comprising:
   a carrier sheet;
   a film defining a plurality of slits configured for forming patterns which conform to the shape of the canopy;
   powder deposited in the slits for demarcating the patterns formed therein; and
   non-permanent adhesive securing the film to the carrier sheet.

45. The system of claim 1 wherein the slits are die cut slits.

46. The system of claim 1 wherein the slits are defined by a plotter.

47. The system of claim 29 wherein the slits are die cut slits.

48. The system of claim 29 wherein the slits are defined by a plotter.

49. The system of claim 39 wherein the patterns are framing patterns.

50. The system of claim 39 wherein the patterns are masks.

51. The system of claim 43 wherein the patterns are framing patterns.

52. The system of claim 43 wherein the patterns are masks.

\* \* \* \* \*

UNITED STATES PATENT AND TRADEMARK OFFICE
CERTIFICATE OF CORRECTION

PATENT NO. : 6,060,141
DATED : May 9, 2000
INVENTOR(S) : Harvey

It is certified that error appears in the above-indentified patent and that said Letters Patent is hereby corrected as shown below:

Column 5, line 19     Delete "accordingly,"
                           Insert --Accordingly,--

Column 5, line 57     Delete "asking"
                           Insert --masking--

Column 6, line 42     Delete "shape of"

Signed and Sealed this

Twentieth Day of March, 2001

Attest:

NICHOLAS P. GODICI

Attesting Officer         *Acting Director of the United States Patent and Trademark Office*